(12) United States Patent
Andersson

(10) Patent No.: US 10,432,596 B2
(45) Date of Patent: Oct. 1, 2019

(54) SYSTEMS AND METHODS FOR CRYPTOGRAPHY HAVING ASYMMETRIC TO SYMMETRIC KEY AGREEMENT

(71) Applicant: Kåre L. Andersson, Svenshögen (SE)

(72) Inventor: Kåre L. Andersson, Svenshögen (SE)

( * ) Notice: Subject to any disclaimer, the term of this patent is extended or adjusted under 35 U.S.C. 154(b) by 167 days.

(21) Appl. No.: 15/858,758

(22) Filed: Dec. 29, 2017

(65) Prior Publication Data

US 2018/0139184 A1 May 17, 2018

Related U.S. Application Data

(63) Continuation-in-part of application No. 15/019,667, filed on Feb. 9, 2016, now abandoned.

(51) Int. Cl.

| | |
|---|---|
| H04L 29/06 | (2006.01) |
| H04L 9/08 | (2006.01) |
| H04L 9/14 | (2006.01) |
| G06F 17/16 | (2006.01) |
| H04L 9/06 | (2006.01) |

(52) U.S. Cl.
CPC ............ *H04L 63/045* (2013.01); *G06F 17/16* (2013.01); *H04L 9/0662* (2013.01); *H04L 9/0838* (2013.01); *H04L 9/0861* (2013.01); *H04L 9/14* (2013.01); *H04L 2209/16* (2013.01)

(58) Field of Classification Search
None
See application file for complete search history.

(56) References Cited

U.S. PATENT DOCUMENTS

| | | | | |
|---|---|---|---|---|
| 8,799,668 | B2* | 8/2014 | Cheng | G09C 1/00 713/184 |
| 2009/0158051 | A1* | 6/2009 | Michiels | H04L 9/002 713/189 |
| 2016/0134642 | A1* | 5/2016 | Hamid | H04L 63/045 713/160 |
| 2016/0218872 | A1* | 7/2016 | Anderson | G06F 8/71 |
| 2018/0173589 | A1* | 6/2018 | Chang | G06F 21/6218 |

* cited by examiner

*Primary Examiner* — Kenny S Lin
(74) *Attorney, Agent, or Firm* — Monarch IP Group, PLLC; April M. Mosby, Esq.

(57) ABSTRACT

A system and method for generating data for use in cryptography or secure modulation is provided. The method may include randomly generating a public code using a secret key, wherein the public code includes an interior matrix and a summing matrix, both having a predetermined dimension of rows and columns. After receipt of the public code and the rule of obfuscation by a receiving computer node, the method may further include generating an obfuscated matrix pattern from the interior matrix, based upon the rule of obfuscation. For symmetric key utilization, the receiving computing node can generate a symmetric code from the summing matrix, based upon the rule of obfuscation, which can be for use in communication between computing nodes. Alternatively, a server node can retrieve or generate the public code and the rule of obfuscation to the computing node. Thereby, each node is enabled to communicate privately with each other.

20 Claims, 10 Drawing Sheets

SYSTEMS AND METHODS FOR CRYPTOGRAPHY HAVING ASYMMETRIC TO SYMMETRIC KEY AGREEMENT

CROSS REFERENCE TO RELATED APPLICATIONS

This present application relates to commonly-owned U.S. patent application Ser. No. 15/019,667, entitled "Key Agreement Algorithm For Cipher Creation over a Public Channel," naming Kåre Lars Magnus Andersson as the inventor, filed Feb. 9, 2016, which is currently co-pending application of which the present application is entitled to the benefit of the filing date; the contents of which are incorporated by herein by reference in its entirety.

BACKGROUND

Cryptography is the science of protecting digital communications from interception and eavesdropping, whereby information is sent as encoded messages, eliminating unauthorized access to the data. Various computing systems use data encryption for security management, whereby the content of the data is scrambled or encrypted. Hence, two principle objectives of encryption are met: secrecy, which prevents unauthorized disclosure; and integrity, which prevents unauthorized modification. Although encryption does not prevent the interception of data communications, it can hide the content of the message from an interceptor. In particular, for an encryption scheme, the message intended for communication may be encrypted based upon an encryption algorithm, which generates cipher text from the message that can only be read if decrypted. An authorized recipient can easily decrypt the message with the key provided by the originator to recipients. Although it is possible for an interceptor to make an effort to try to decrypt the message without possessing the key, the large amount of computational resources and skill necessary does pose a significant problem for a well-designed encryption scheme.

The problem with this symmetric key approach for data encryption is that the sender and the receiver must share a common key. Using an asymmetric key scheme solves the problem of maintaining the privacy of the key. In particular, asymmetric encryption is based on a key pair, wherein one secret key is used for decryption and one public key is used for encryption. A primary computing node creates this pair of keys. When a secondary computing node wants to convey a confidential message to the primary computing node, it uses the public key to encrypt the message. The primary computing node now uses his private key to decrypt the encrypted message sent by the secondary computing node. In the context of bidirectional communication, the problems that arise with asymmetric key encryption are that the public key cannot be used for decryption and the primary computing node is the only party that can create the pair of keys.

Rivest-Shamir-Adleman (RSA) cryptography is a data encryption scheme that uses both the asymmetric and symmetric schemes for interchanging data sessions between two parties over the Internet, for example. A second major asymmetric approach to accomplish the buildup of a secret information pool between a sender and a receiver, or a group of inter messaging parties, is the Diffie Hellman algorithm, which is defined as a key agreement algorithm. There exists an underlying, mathematical problem for an unauthorized agent when trying to hack the encryption scheme as defined by both RSA and the Diffie Hellman algorithm: namely, prime factorization; where, due to the excessive amount of calculations to decompose a sum of two primes into its founding constituents, the hacking process becomes too time consuming to complete. The most efficient way to get around this problem may include the implementation of the General Number Field Sieve (GNFS), which is merely a fast trial and error approach.

Although asymmetric encryption can be used without inclusion of prior secrets to establish a communication session, it is approximately 200 to 1000 times more computationally costly than symmetric encryption. Given this fact and the notion that asymmetric encryption within RSA requires more information resources to accomplish a specified level of security, the cost of a message exchange keyed with RSA will approach 25 times the cost of a 128 bit symmetrically keyed exchange having the same information content. Unfortunately for higher security levels, this ratio rapidly increases.

It is within this context that the embodiments arise.

SUMMARY

Embodiments of a system and method for cryptography and secure modulation are provided. It should be appreciated that the present embodiment can be implemented in numerous ways, such as a process, an apparatus, a system, a device, or a method. Several inventive embodiments are described below.

In some embodiments, a system and method for generating data for use in cryptography or secure modulation is provided. The method may include randomly generating a public code using a secret key, wherein the public code includes an interior matrix and a summing matrix, both having a predetermined dimension of rows and columns. This dimension may be broadcasted to other computing nodes along with a rule of obfuscation. After receipt of the public code and the rule of obfuscation by a receiving computer node, the method may further include generating an obfuscated matrix pattern from the interior matrix, based upon at least a subset of the parameters within the rule of obfuscation. For symmetric key utilization, the receiving computing node can generate a symmetric code from the summing matrix, based upon the rule of obfuscation, which can be for use in communication between computing nodes. Alternatively, a server node can retrieve the public code and the rule of obfuscation from a storage device; or the server node can generate and send the public code and the rule of obfuscation to the computing node. Thereby, each node is enabled to communicate privately with each other.

In some embodiments, a computing device is provided. The computing device may comprise a memory and a processor operable to generate a public code using a secret key, wherein the public code may include an interior matrix and a summing matrix, both having a predetermined dimension of rows and columns. The processor may further be operable to generate an obfuscated matrix pattern from the interior matrix, based upon the public code and the rule of obfuscation, which may be received from another computing device or storage node. For symmetric key utilization, the processor may be operable to generate a symmetric code from the summing matrix, based upon the rule of obfuscation, for use in communication between the computing device and another computing device.

In some embodiments, a tangible, non-transitory, computer-readable media having instructions whereupon which, when executed by a processor, cause the processor to perform the cryptography method described herein. The method may include randomly generating a public code using a secret key, wherein the public code includes an interior matrix and a summing matrix, both having a predetermined dimension of rows and columns. After receipt of the public code and the rule of obfuscation by a receiving computer node, the method may further include generating an obfuscated matrix pattern from the interior matrix, based upon the rule of obfuscation. For symmetric key utilization, the receiving computing node can generate a symmetric code from the summing matrix, based upon the rule of obfuscation, which can be for use in communication between computing nodes. Alternatively, a server node may serve as a medium between the two computing nodes or may serve as an initiator, retrieving and generating the public code and the rule of obfuscation. Thereby, each node is enabled to communicate privately with each other.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1:
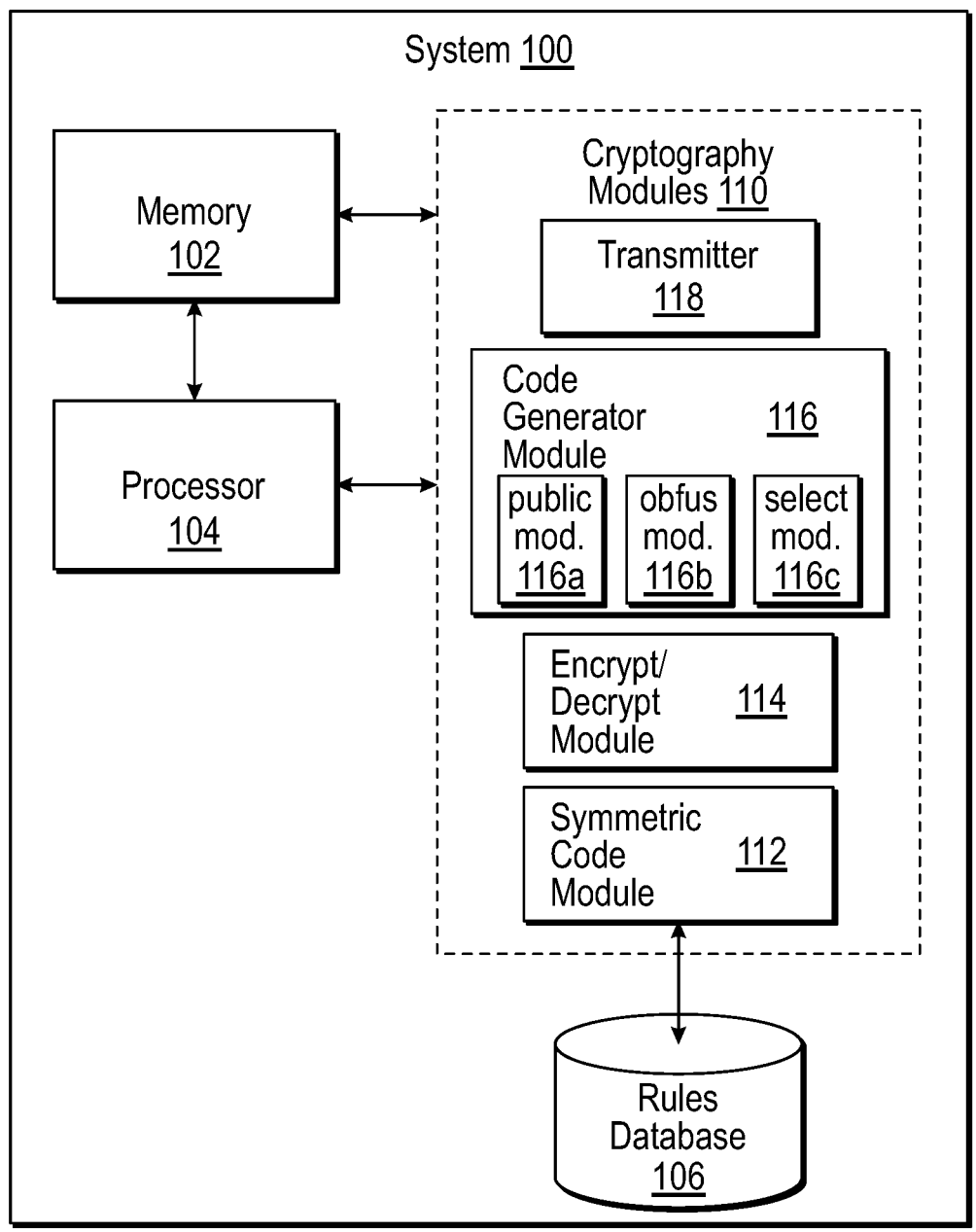
FIG. 1 is a block diagram of an exemplary system for generating data for use in cryptography or secure modulation, in accordance with some embodiments.

The following embodiments describe a system and method for cryptography and secure modulation. It can be appreciated by one skilled in the art, that the embodiments may be practiced without some or all of these specific details. In other instances, well known process operations have not been described in detail in order not to unnecessarily obscure the embodiments.

In some embodiments for a system of generating data for use in cryptography or secure modulation, the method may include randomly generating a public code using a secret key, wherein the public code includes an interior matrix and a summing matrix, both having a predetermined dimension of rows and columns. A rule of obfuscation may be either generated or retrieved from a storage device, wherein the rule of obfuscation includes the methodology for obfuscating the interior matrix in addition to the predetermined dimension of rows and columns for both the interior matrix and the summing matrix. In some embodiments, a server may represent the node that generates the public code and the rule of obfuscation. In the alternative, a computing node coupled as a client to the server may generate one or both. The server or client node may send the public code and rule of obfuscation to another computing node for the purpose of initiating communication, while maintaining the secrecy of the secret key. After receipt of the public code and a rule of obfuscation, the receiving computing node may generate an obfuscated matrix pattern from the interior matrix, based upon the rule of obfuscation. For symmetric key utilization, the receiving computing node can also generate a symmetric code from the summing matrix, based upon the rule of obfuscation, which can be for use in communication between the receiving computing node and another computing node in the case where the server initiates the cryptography methodology. Alternatively, the communication can exist between another client node and the receiving computing node, when the client node initiates the cryptography methodology herein. Upon derivation of the symmetric code, the receiving computing node may commence communication with the other computing node using the symmetric code to encrypt a message to be delivered to the other computing node. In the alternative, the receiving computing node may send the obfuscated matrix pattern to the second computer node, while maintaining the secrecy of the symmetric code. Upon receipt of the obfuscated matrix pattern, the second computing node may retrieve the symmetric key based upon the secret key that was used to generate the public code. In particular, a logical AND operation may be performed upon the secret key and the obfuscated matrix pattern to generate a translated obfuscation matrix. A sum modulo 2 operation can be performed upon each row vector of the translated obfuscation matrix to form the symmetric code, wherein the sum modulo 2 of each row vector represents a corresponding bit of the symmetric code. Thereby, each computing node is enabled to communicate privately with each other using the symmetric code to encrypt and decrypt messaging for transmission.

Some embodiments may generate the public code using a random number generator, whereby the seed is known by both the sending and receiving computing node prior to commencing the communication session. In particular, the secret key and the elements of the interior matrix may be generated using a random number generator. In the alternative, the seed value for the secret key and the interior matrix can be generated through a combination of protected device embedded real random number generators and pseudo-random number generators along with device-based entropies for seeding and the like. A logical AND operation can be performed upon the secret key and the interior matrix pattern to generate a resultant matrix. Next, a Boolean operation of an exclusive OR (XOR) may be performed on each column vector of the resultant matrix to form the summing matrix, wherein each row rector is added together using an XOR. In the alternative, a sum modulo 2 operation can be performed upon each row vector of the resultant matrix to form the summing matrix, wherein each sum represents a corresponding element of the summing matrix.

In some embodiments, the sending computing node sends the random seed that was used to generate the interior matrix instead of sending the entire public code. Upon receipt of this random seed, the receiving computing node may generate the interior matrix using the seed and with an open algorithm. In this manner, bandwidth is saved and the solution can become more cost efficient than sending an entire matrix. In some embodiments, the algorithm may be secret instead of open.

Some embodiments in accordance with the system of cryptography described herein may generate the obfuscated matrix pattern by generating a select vector based upon the rule of obfuscation as applicable to the use of a random number generator or a combination of protected device embedded real random number generators and pseudo-random number generators along with device-based entropies for seeding and the like. In particular, a random number may be generated based upon the seed value determined by the rule of obfuscation. This generated random number may then be translated into a binary value, wherein each bit represents an element in the select vector having a predetermined length corresponding to the predetermined dimension of the interior matrix, as defined by the rule of obfuscation. Upon receipt of the public code, the receiving computing node may parse the interior matrix from the public code based upon the predetermined dimension defined in the rule of obfuscation. Thereby, a logical AND operation may be performed upon the select vector and the interior matrix to form a translated matrix code. A XOR operation may be performed on each column vector of the translated matrix code to form the obfuscated matrix pattern, wherein each row rector is added together using the XOR. In the alternative, a sum modulo 2 logical operation may be performed on each column vector of the translated matrix code to form the obfuscated matrix pattern, wherein each sum represents an element in a row vector of the obfuscated matrix pattern.

For symmetric code generation, some embodiments in accordance with the system of cryptography described herein may first generate the select vector as noted above, based upon the rule of obfuscation as applicable to the use of a random number generator or a combination of protected device embedded real random number generators and pseudo-random number generators along with device-based entropies for seeding and the like. Upon receipt of the public code, the receiving computing node may parse the summing matrix from the public code based upon the predetermined dimension defined in the rule of obfuscation. Thereby, a logical AND operation may be performed upon the select vector and the summing matrix to form a translated summing matrix. A sum modulo 2 logical operation may be performed on each column vector of the translated summing matrix to form the symmetric code, wherein each sum of each column vector represents a corresponding element of the symmetric code.

In some embodiments in accordance with the system of cryptography described herein, the receiving computing node may send an entirely new, original public code, having a differing interior matrix and summing matrix. In this implementation, no standing session key exist. Each symmetric key can be used to encrypt and decrypt a single message. In another embodiment, the receiving computing node can skip the use of a symmetric key and generate obfuscated matrix pattern, sending it to the initial computing node. This method, however, may increase the bandwidth necessary to communicate.

Advantageously, the method of cryptography in accordance with the system disclosed herein achieves a faster and more secure method of secure modulation than that which previous systems have provided. A communication system may benefit from the significant improvement of the system of cryptography disclosed herein that allows formation of keys of symmetric session type or consecutive nature, over an insecure medium, without prior secrets and without the high costs associated with previously know asymmetric/symmetric key techniques. As such, the method in accordance with some of the embodiments disclosed herein establishes a first or successive shared secret between a sender and a receiver over a non-secure channel in an optimal and cost effective manner, rendering the highest information density, level of obfuscation and security.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "sending," "transmitting," "generating," "installing," "monitoring," "receiving," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, an exemplary embodiment of system for generating data for use in cryptography or secure modulation is shown. As illustrated in this figure, exemplary system 100 may include a memory 102, a processor 104, and a storage database 106. The system may include one or more cryptography modules 110 for performing one or more tasks. For example, and as will be explained in greater detail below, exemplary system 100 may include a transmitter 118 that may send and receive, at a server and from a client, a request that seeks to communicate according to a key agreement process for encryption. In addition, transmitter 118 may couple to receive the public code and an obfuscated matrix pattern in accordance with the process disclosed herein. Exemplary system 100 may additionally include a code generator module 116 that may generate a public code, an obfuscated matrix pattern, and a select vector, as designated by respective modules 116a, 116b, and 116c. Exemplary system 100 may also include an encryption/decryption module 114 that may encrypt and decrypt a message, in accordance with a symmetric code. Exemplary system 100 may additionally include a symmetric code module 112 that may generate a symmetric code based upon the summing matrix and the rule of obfuscation as will be described in greater detail below. Although illustrated as separate elements, one or more of modules 110 in FIG. 1 may represent portions of a single module or application. As noted above, system 100 may further include memory 102 and a processor 104, which couple to the cryptography modules 110 for the processing and exchange of data. The storage unit 106 for holding a rules database may couple to the cryptography modules 110 for the purpose of storing the communicated rule of obfuscation received from another client node.

In certain embodiments, one or more of modules 110 in FIG. 1 may represent one or more software applications or programs that, when executed by a computing device, may cause the computing device to perform one or more tasks. For example, and as will be described in greater detail below, one or more of modules 110 may represent software modules stored and configured to run on one or more computing devices, such as the devices illustrated in FIG. 2 (e.g., computing device 210 and/or server 240), and/or computing system 1110 in FIG. 11. One or more of modules 110 in FIG. 1 may also represent all or portions of one or more special-purpose computers configured to perform one or more tasks.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 2:
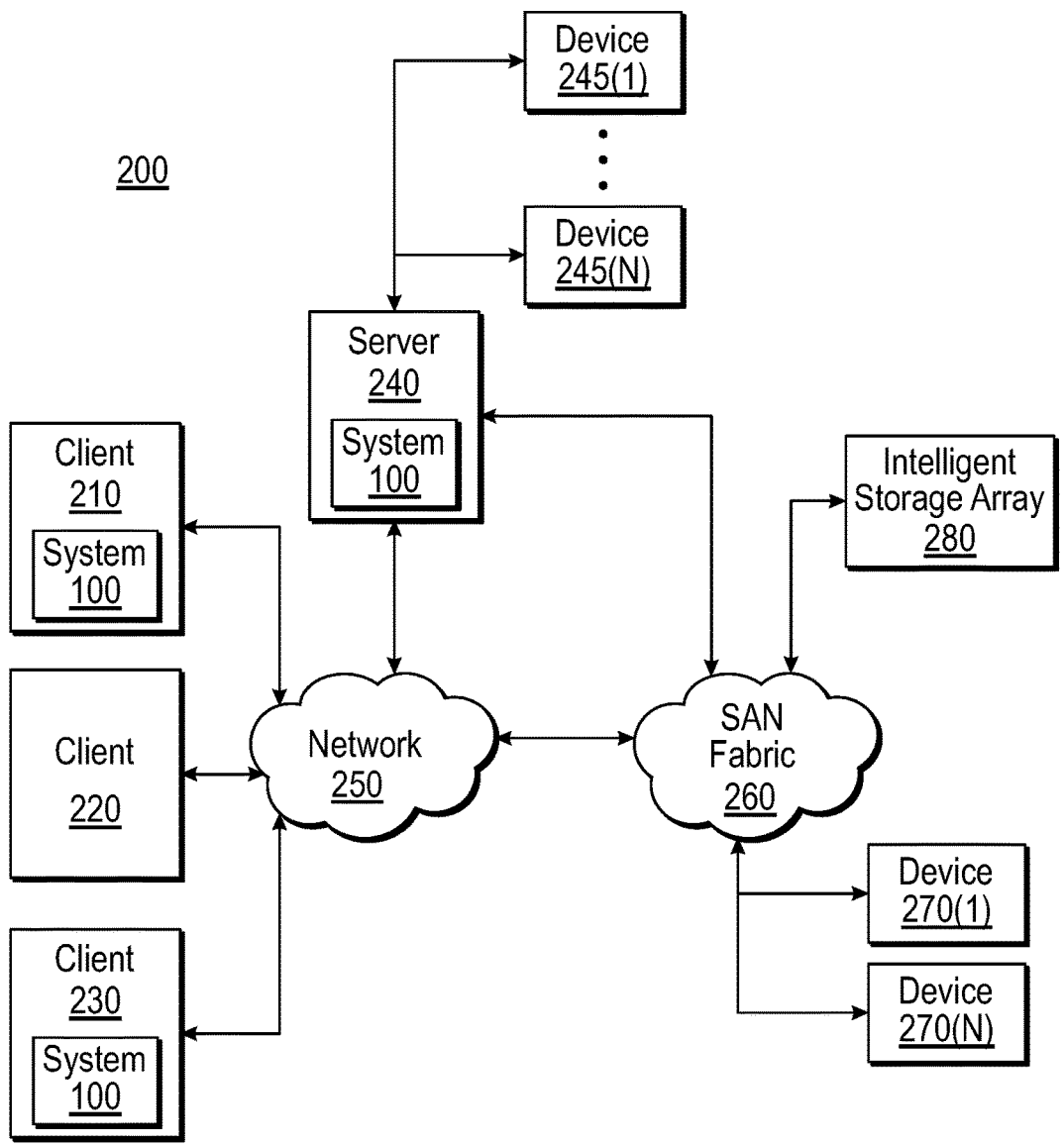
FIG. 2 is a block diagram of another exemplary network for generating data for use in cryptography or secure modulation, in accordance with some embodiments.

Exemplary system 100 in FIG. 1 may be implemented in a variety of ways. For example, all or a portion of exemplary system 100 may represent portions of exemplary system 200 in FIG. 2. As shown in FIG. 2, exemplary network architecture 200 may include client systems (computing devices) 210, 220, and 230 and in communication with server 240 through network 250. As detailed above, all or a portion of network architecture 200 may perform and/or be a means for performing, either alone or in combination with other elements, one or more of the steps disclosed herein (such as one or more of the steps illustrated in FIG. 6). All or a portion of network architecture 200 may also be used to perform and/or be a means for performing other steps and features set forth in the instant disclosure. In one example, computing device 210 may be programmed with one or more of modules 110. Additionally or alternatively, server 240 may be programmed with one or more of modules 110. Although not shown, in various embodiments, the client node (210, 220, 230) including system 100 may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

Figure 11:
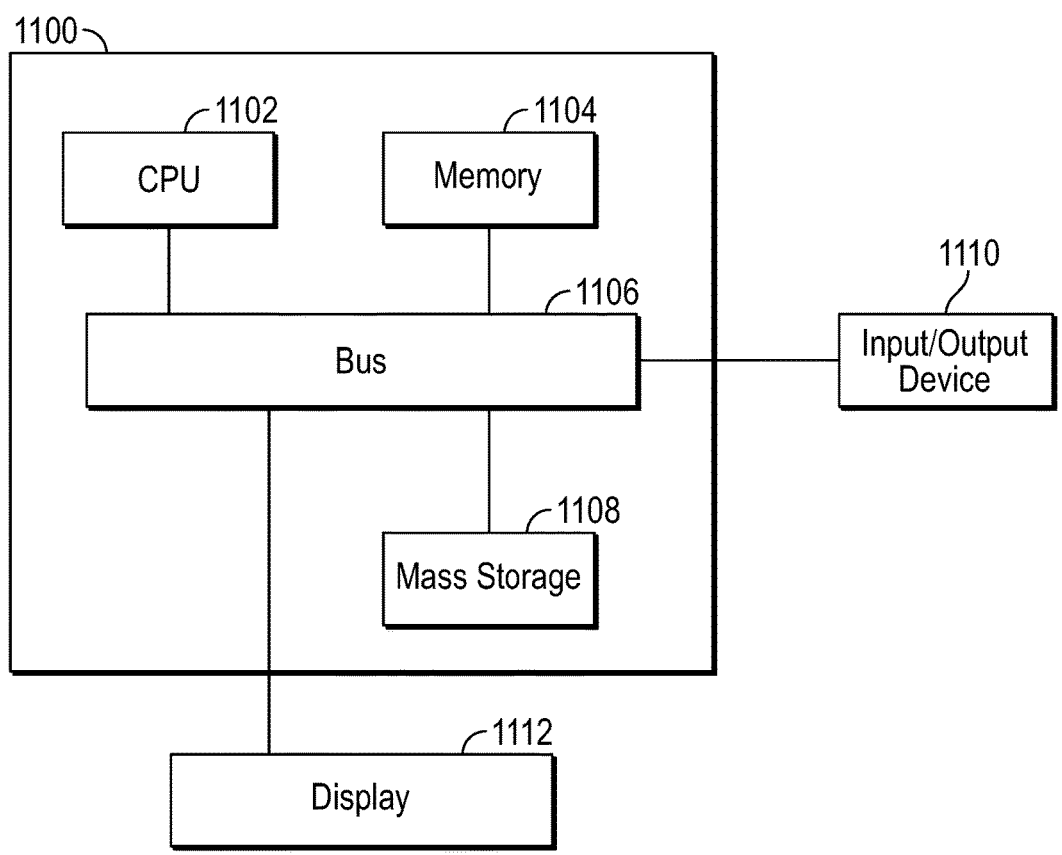
FIG. 11 is a block diagram of an exemplary computing system capable of implementing one or more of the embodiments described and/or illustrated herein.

Client systems 210, 220, and 230 generally represent any type or form of computing device or system, such as exemplary computing system 1110 in FIG. 11. Similarly, server 240 generally represents computing devices or systems, such as application servers or database servers, configured to provide various database services and/or run certain software applications. Network 250 generally represents any telecommunication or computer network including, for example, an intranet, a WAN, a LAN, a PAN, or the Internet. In one example, client systems 210, 220, and/or 230 and/or server 240 may include all or a portion of system 100 from FIG. 1.

In some embodiments, one or more storage devices 245(1)-(N) may be directly attached to server 240. Storage devices 245(1)-(N) generally represent any type or form of storage device or medium capable of storing data and/or other computer-readable instructions. In certain embodiments, storage devices 245(1)-(N) may represent Network-Attached Storage (NAS) devices configured to communicate with server 740 using various protocols, such as Network File System (NFS), Server Message Block (SMB), or Common Internet File System (CIFS)

Server 240 may also be connected to a Storage Area Network (SAN) fabric 260. SAN fabric 260 generally represents any type or form of computer network or architecture capable of facilitating communication between a plurality of storage devices. SAN fabric 260 may facilitate communication between server 240 and a plurality of storage devices 270(1)-(N) and/or an intelligent storage array 280. SAN fabric 260 may also facilitate, via network 250 and server 240, communication between client systems 210, 220, and 230 and storage devices 270(1)-(N) and/or intelligent storage array 280 in such a manner that devices 270(1)-(N) and array 280 appear as locally attached devices to client systems 210, 220, and 230.

In certain embodiments, and with reference to exemplary computing system 1110 of FIG. 11, a communication interface may be used to provide connectivity between each client system 210, 220, and 230 and network 250. Client systems 210, 220, and 230 may be able to access information on server 240 using, for example, a web browser or other client software. Such software may allow client systems 210, 220, and 230 to access data hosted by server 240, storage devices 245(1)-(N), storage devices 270(1)-(N), or intelligent storage array 280. Although FIG. 2 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 240, storage devices 245(1)-(N), storage devices 270(1)-(N), or intelligent storage array 280, or any combination thereof. All or a portion of one or more of the exemplary embodiments disclosed herein may also be encoded as a computer program, stored in server 240, and distributed to client systems 210, 220, and 230 over network 250.

One or more components of network architecture 200 may perform and/or be a means for performing, either alone or in combination with other elements, one or more steps of an exemplary method for cryptography.

It is appreciated that the components of exemplary operating environment 200 are exemplary and more or fewer components may be present in various configurations. It is appreciated that operating environment may be part of a distributed computing environment, a cloud computing environment, a client server environment, and the like.

Figure 3:
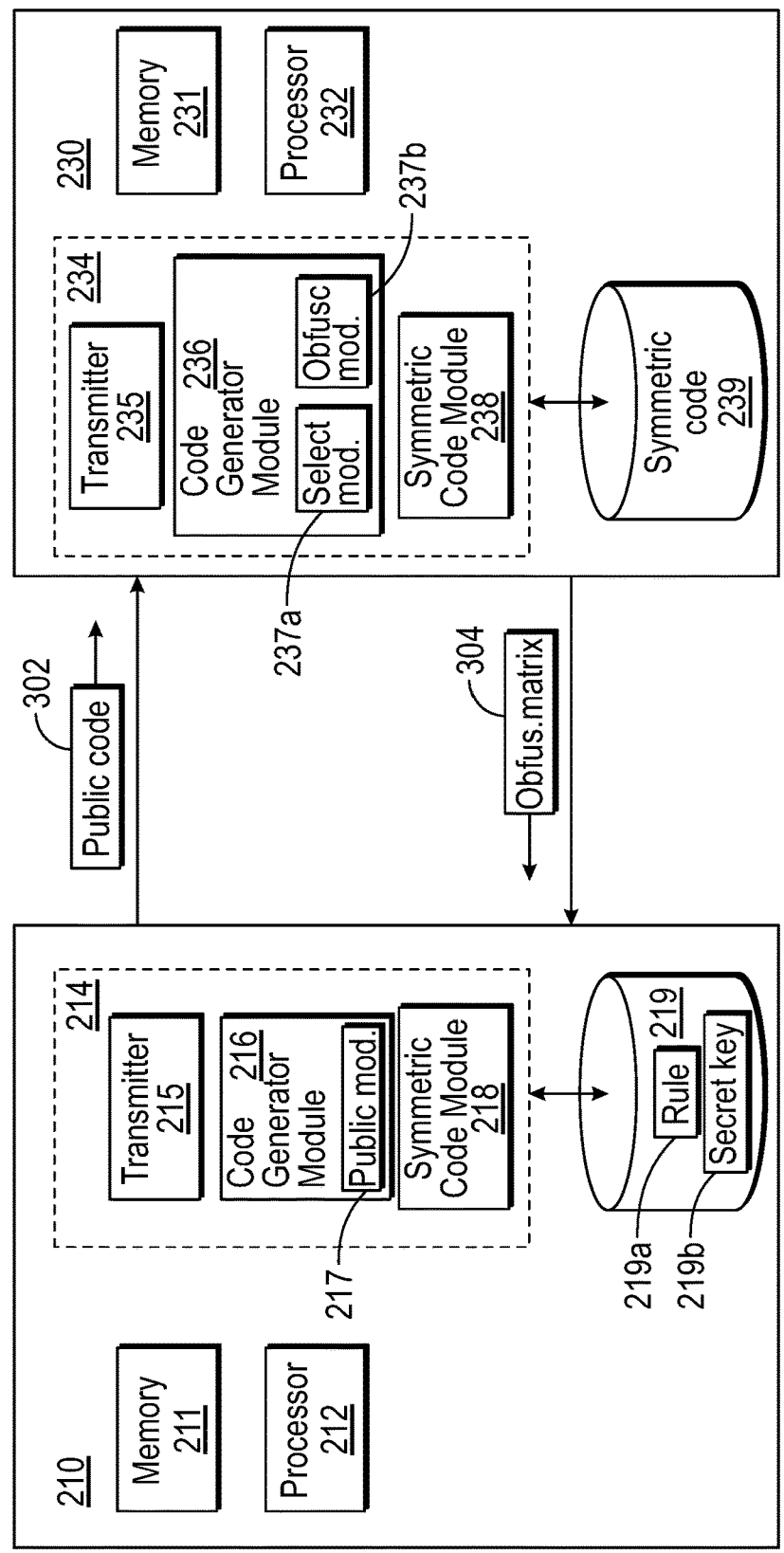
FIG. 3 is a block diagram illustrating the data transfer during the asymmetric phase between computing nodes of FIG. 2; wherein, the modules active during this phase are displayed and the inactive modules are not shown.
Figure 4:
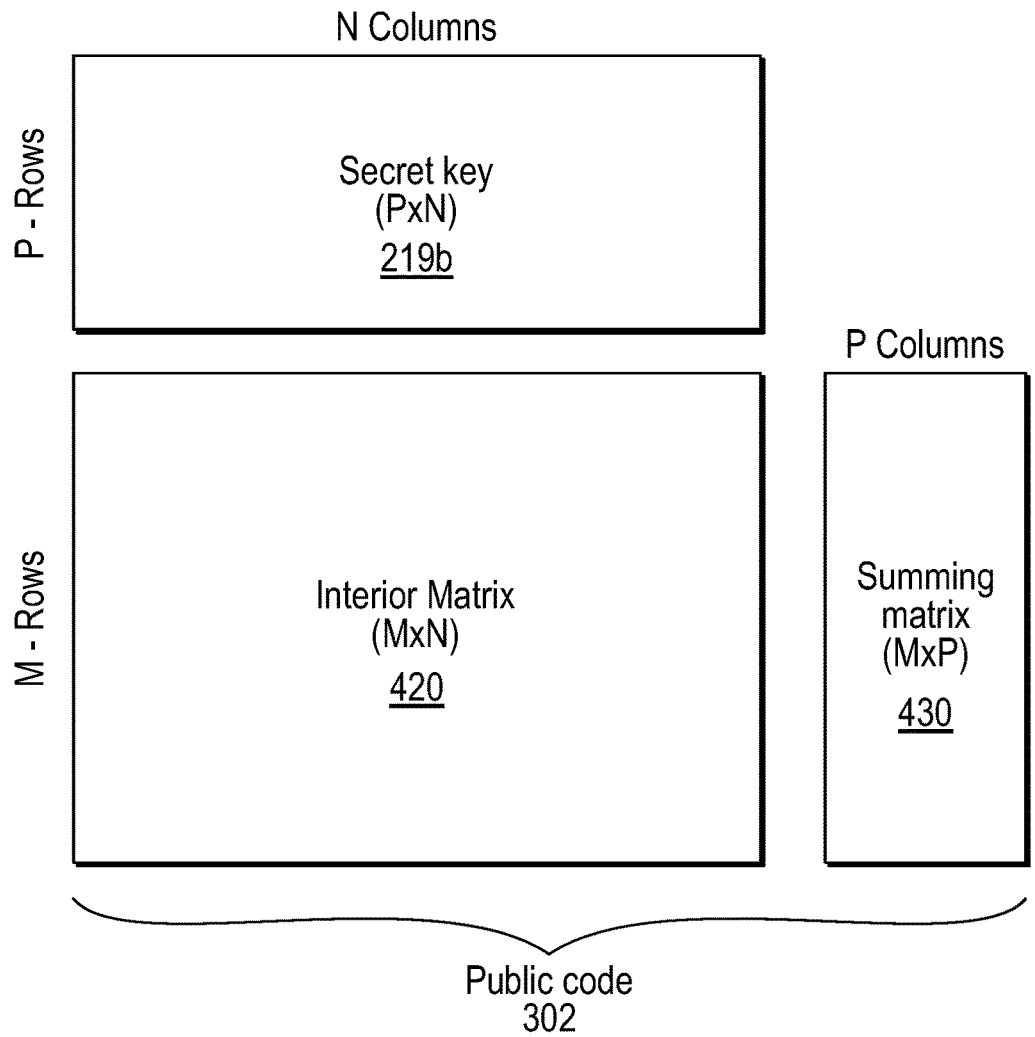
FIG. 4 is a block diagram illustrating the data format for the secret key and the public code stored on a first computing node in accordance with some embodiments.

In accordance with an exemplary embodiment of the system having the method of cryptography defined herein, the process of communication may include two phases: a first asymmetric phase and a second symmetric communication phase. In the first phase as shown in FIG. 3, a client device 210 and/or the server (not shown) may initiate asymmetric transfer of a public code to client device 230. In response, client device 230 may instantiate the asymmetric transfer of an obfuscated matrix pattern for the purpose of establishing a symmetric code. In particular, referring to FIG. 3, a block diagram illustrating the data transfer during the asymmetric phase between computing nodes of FIG. 2 is shown; wherein, the modules active during this phase are displayed and the inactive modules are not shown. As illustrated in this figure, exemplary client devices 210 and 230 may include one or more modules 214 and 234 for performing one or more tasks in conjunction with memory (211, 231) and processor (212, 232). For example, in operation, exemplary client device 210 may include a transmitter 215 that may send and receive, at a server (not shown) or from a client 230, a request that client 230 seeks to communicate according to a key agreement process for encryption disclosed herein. Consequently, the public module 217 of code generator module 216 may generate a public code 302 using a secret key 219b located in the rules database 219, wherein the public code 302 includes an interior matrix 420 and a summing matrix 430, both having a predetermined dimension of rows and columns as shown in FIG. 4. In particular, the secret key may include 1-P rows and 1-N columns; while the interior matrix may include 1-M rows and 1-N columns. In some embodiments, public module 217 may generate the public code using a random number generator, whereby the seed is known by both client devices 210 and 230 prior. In particular, the secret key 219b and the elements of the interior matrix 420 may be generated using a random number generator (not shown). In the alternative, the seed value for the secret key 219b and the interior matrix 420 can be generated through a combination of protected device embedded real random number generators and pseudo-random number generators along with device-based entropies for seeding and the like (not shown). A logical AND operation can be performed upon the secret key 219b and the interior matrix 420 to generate a resultant matrix (not shown). Next, a sum modulo 2 logical operation can be performed upon each row vector of the resultant matrix to form the summing matrix 430, wherein each sum represents a corresponding element of the summing matrix 430.

Client 210 may generate a rule of obfuscation 219a or retrieve it from a storage device 219, wherein the rule of obfuscation 219a includes the methodology for obfuscating the interior matrix 420 in addition to the predetermined dimension of rows (M) and columns (N, P) for both the interior matrix and the summing matrix, 420 and 430, respectively. In some embodiments, a server (not shown) may represent the node that generates the public code 302 and the rule of obfuscation 219a.

Using transmitter 215, client device 210 may send the public code 302 and rule of obfuscation 219a to client node 230. After receipt of the public code 302 and a rule of obfuscation 219a through transmitter 235, the receiving client node 230 may generate a full obfuscated matrix pattern 304 from the interior matrix 420 using the code generator module 236 in conjunction with memory 231 and processor 232, based upon at least a subset of the parameters associated with the rule of obfuscation 219a. For symmetric key utilization, the client node 230 can also generate a symmetric code 239 from the summing matrix 430, based upon the rule of obfuscation 219a. Upon derivation of the symmetric code, client node 230 may commence communication with the other client node 210 using the symmetric code 239 to encrypt a message to be delivered to the other computing node. In the alternative, the client node 230 may send the full obfuscated matrix pattern 304 to the client node 210 as shown. Upon receipt of the obfuscated matrix pattern 304, client 210 may retrieve the symmetric key based upon the secret key 219b that was used to generate the public code 302 using the symmetric code module 218. In particular, a logical AND operation may be performed upon the secret key 219b and the obfuscated matrix pattern 304 to generate a translated obfuscation matrix (not shown). A sum modulo 2 operation can be performed upon each row vector of the translated obfuscation matrix to form the symmetric code, wherein the sum modulo 2 of each row vector represents a corresponding bit of the symmetric code. Thereby, each client node is enabled to communicate privately with each other using the symmetric code to encrypt and decrypt messaging for transmission.

Figure 5:
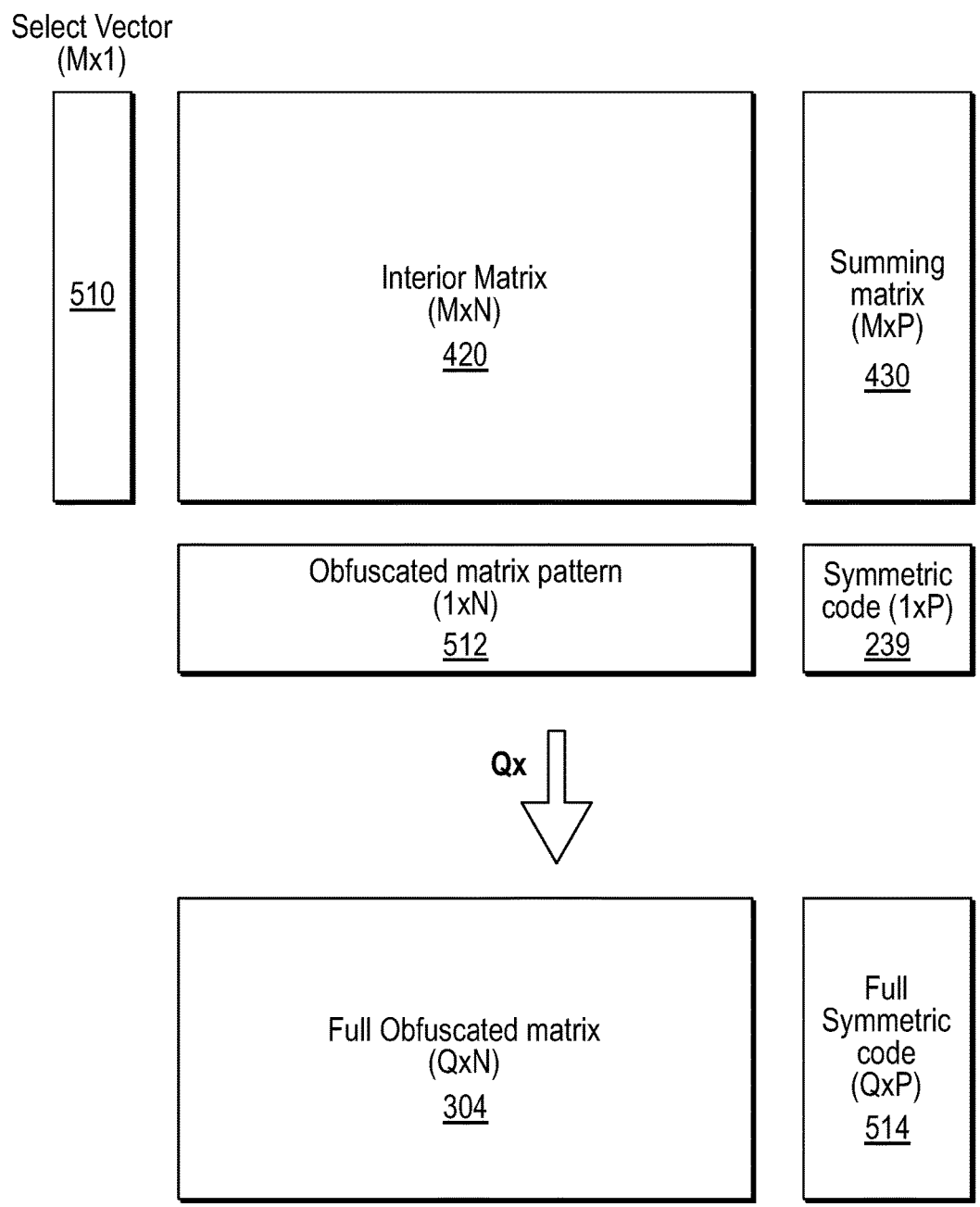
FIG. 5 is a block diagram illustrating the data format for the select vector and the public code stored on a second computing node in accordance with some embodiments.

Particularly, some embodiments in accordance with the system of cryptography described herein, client node 230 may generate the full obfuscated matrix pattern 304 by generating a select vector 510 shown in FIG. 5, based upon the rule of obfuscation 219a as applicable to the use of a random number generator or a combination of protected device embedded real random number generators and pseudo-random number generators along with device-based entropies for seeding and the like. In particular, obfuscation module 237b may generate an intermediate obfuscated matrix pattern 512, while the select module 237a may generate a select vector 510. First, a random number may be generated based upon the seed value determined by the rule of obfuscation 219a. This generated random number may be then translated into a binary value, wherein each bit represents an element in the select vector 510 having a predetermined length (M) corresponding to the predetermined dimension of the interior matrix 420, as defined by the rule of obfuscation 219a. Upon receipt of the public code 302, client node 230 may parse the interior matrix 420 from the public code 302 based upon the predetermined dimension defined in the rule of obfuscation 219a. Thereby, a logical AND operation may be performed upon the select vector 510 and the interior matrix 420 to form a translated matrix code (not shown). A sum modulo 2 logical operation may be performed on each column vector of the translated matrix code to form the intermediate obfuscated matrix pattern 512, wherein each sum represents an element in a row rector of the obfuscated matrix pattern. The aforementioned process may be performed repetitively up to Q times with different independent select vectors to generate a full, obfuscated matrix pattern 304.

For symmetric code generation, the symmetric code module 238 of client node 230 may first generate the select vector as noted above, based upon the rule of obfuscation 219a as applicable to the use of a random number generator or a combination of protected device embedded real random number generators and pseudo-random number generators along with device-based entropies for seeding and the like. Client node 230 may parse the summing matrix 430 from the public code 302 based upon the predetermined dimension (M×P) defined in the rule of obfuscation 219a. Thereby, a logical AND operation may be performed upon the select vector 510 and the summing matrix 430 to form a translated summing matrix (not shown). A sum modulo 2 logical operation may be performed on each column vector of the translated summing matrix to form the symmetric code 239, wherein each sum of each column vector represents a corresponding element of the symmetric code. As illustrated for this example, these steps may be repeated Q times with different independent select vectors to generate a full symmetric code 514.

During the communication phase, client devices, 210 and 230, include encryption/decryption modules within modules, 214 and 234, that may encrypt and decrypt messages, in accordance with a symmetric code.

In yet another embodiment, the use of a Boolean NOT can be employed as a last operation for the initial computing node and the receiving computing node. This can be analogous to a N+1 column for the public code, where the interior matrix has the dimensions of M×N and the last element in each row vector of the interior matrix is a "1." Presuming use of boolean NOT over both phases of the asymmetric transfer, the use of the NOT for the primary phase can be implied as N+1 (having an extra column), while a reversal of all bits exists when the NOT is applied during in the secondary phase. Given this implementation, the initial computing node 210 may randomly set the secret key to N columns. If the number of "1"s in the row vector of the secret key is odd, the extra column for the secret key is set to 0. If the number of "1"s in the row vector of the secret key is even, the extra column for the secret key is set to 1. This means that the real number of "1"s for the entire secret key, and therefore the number of active interior matrix columns, will always be odd. The initial client 210 may then send the public code 302 as noted above. Consequently, the receiving client 230 can employ the NOT operation as a last step of generating the obfuscated matrix pattern. When the number of active variables are odd, the row vectors of the interior matrix will either contain an odd number of "1"s and an even number of "0"s or vice versa. The Boolean NOT function over the entire interior matrix 420 will therefore turn an odd number of "1"s into an even numbers of "1"s (former "0"s) and an even number of "0"s into an odd number of "0"s (former "1"s), or vice versa.

Figure 6:
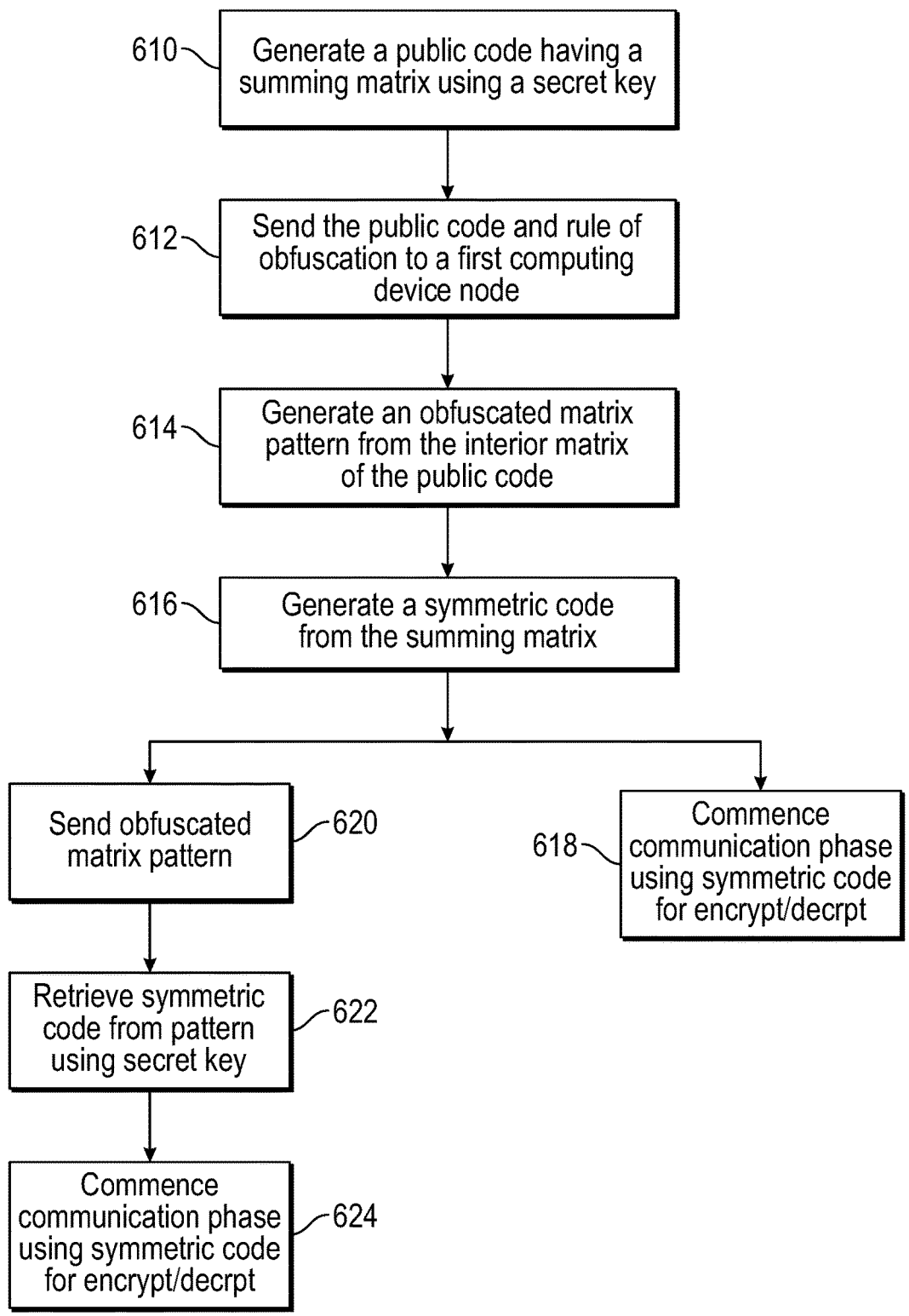
FIG. 6 is an exemplary flow diagram of a method for generating data for use in cryptography or secure modulation, in accordance with some embodiments.

FIG. 6 is an exemplary flow diagram of a method for generating data for use in cryptography or secure modulation, in accordance with some embodiments. In an action 610, the cryptography system 100 may generate a secret key and a public code, wherein the public code includes an interior matrix and a summing matrix, both having a predetermined dimension of rows and columns. For example, system 100 may generate the public code 302 using a random number generator, whereby the seed is known by both the sending and receiving computing node (210, 230) prior to commencing the communication session. In particular, the secret key and the elements of the interior matrix 420 may be generated using a random number generator. In the alternative, the seed value for the secret key 219b and the interior matrix 420 can be generated through a combination of protected device embedded real random number generators and pseudo-random number generators along with device-based entropies for seeding and the like. A logical AND operation can be performed upon the secret key 219b and the interior matrix pattern 420 to generate a resultant matrix. Next, a sum modulo 2 operation can be performed upon each row vector of the resultant matrix to form the summing matrix 430, wherein each sum represents a corresponding element of the summing matrix. A rule of obfuscation may be either generated or retrieved from a storage device 219, wherein the rule of obfuscation includes the methodology for obfuscating the interior matrix in addition to the predetermined dimension of rows and columns for both the interior matrix and the summing matrix. In some embodiments, a server 240 may represent the node that generates the public code and the rule of obfuscation. In the alternative, a computing node 210 coupled as a client to the server 240 may generate one or both. The server 240 or client node 210 may send the public code 302 and rule of obfuscation to another computing node for the purpose of initiating communication.

In an action 612, the cryptography system 100 may send the public code and a rule of obfuscation to the first computing device node. After receipt of the public code 302 and a rule of obfuscation from computing node 210, the receiving computing node 230 may generate an obfuscated matrix pattern 304 from the interior matrix 420, based upon the rule of obfuscation, in an action 614. For example, computing device 230 may generate the obfuscated matrix pattern 304 by generating a select vector 510 based upon the rule of obfuscation as applicable to the use of a random number generator or a combination of protected device embedded real random number generators and pseudo-random number generators along with device-based entropies for seeding and the like. In particular, a random number may be generated based upon the seed value determined by the rule of obfuscation. This generated random number may be then translated into a binary value, wherein each bit represents an element in the select vector having a predetermined length corresponding to the predetermined dimension of the interior matrix 420, as defined by the rule of obfuscation. Upon receipt of the public code 302, the receiving computing node 230 may parse the interior matrix from the public code based upon the predetermined dimension defined in the rule of obfuscation. Thereby, a logical AND operation may be performed upon the select vector and the interior matrix to form a translated matrix code. A sum modulo 2 logical operation may be performed on each column vector of the translated matrix code to form the obfuscated matrix pattern 304, wherein each sum represents an element in a row rector of the obfuscated matrix pattern.

For symmetric key utilization in an action 616, the receiving computing node can also generate a symmetric code from the summing matrix, based upon the rule of obfuscation, which can be for use in communication between the receiving computing node and another computing node in the case where the server initiates the cryptography methodology. In an action 618, the receiving computing node may commence communication with the other computing node using the symmetric code to encrypt a message to be delivered to the other computing node. For example, computing node 230 may first generate the select vector 510 as noted above, based upon the rule of obfuscation as applicable to the use of a random number generator or a combination of protected device embedded real random number generators and pseudo-random number generators along with device-based entropies for seeding and the like. Upon receipt of the public code 302, the receiving computing node may parse the summing matrix 430 from the public code 302 based upon the predetermined dimension defined in the rule of obfuscation. Thereby, a logical AND operation may be performed upon the select vector 510 and the summing matrix 430 to form a translated summing matrix. A sum modulo 2 logical operation may be performed on each column vector of the translated summing matrix to form the symmetric code 239, wherein each sum of each column vector represents a corresponding element of the symmetric code 239.

In the alternative, in an action 620, the receiving computing node may send the obfuscated matrix pattern to the second computer node. For example, client 230 may send the obfuscated matrix pattern to client 210. Upon receipt of the obfuscated matrix pattern, the second computing node 210 in action 622 may retrieve the symmetric key based upon the secret key that was used to generate the public code. In particular, a logical AND operation may be performed upon the secret key and the obfuscation matrix pattern to generate a translated obfuscation matrix. A sum modulo 2 operation can be performed upon each row vector of the translated obfuscation matrix to form the symmetric code, wherein the sum modulo 2 of each row vector represents a corresponding bit of the symmetric code. Thereby, each computing node is enabled to communicate privately with each other using the symmetric code to encrypt and decrypt messaging for transmission in an action 624.

Figure 7:
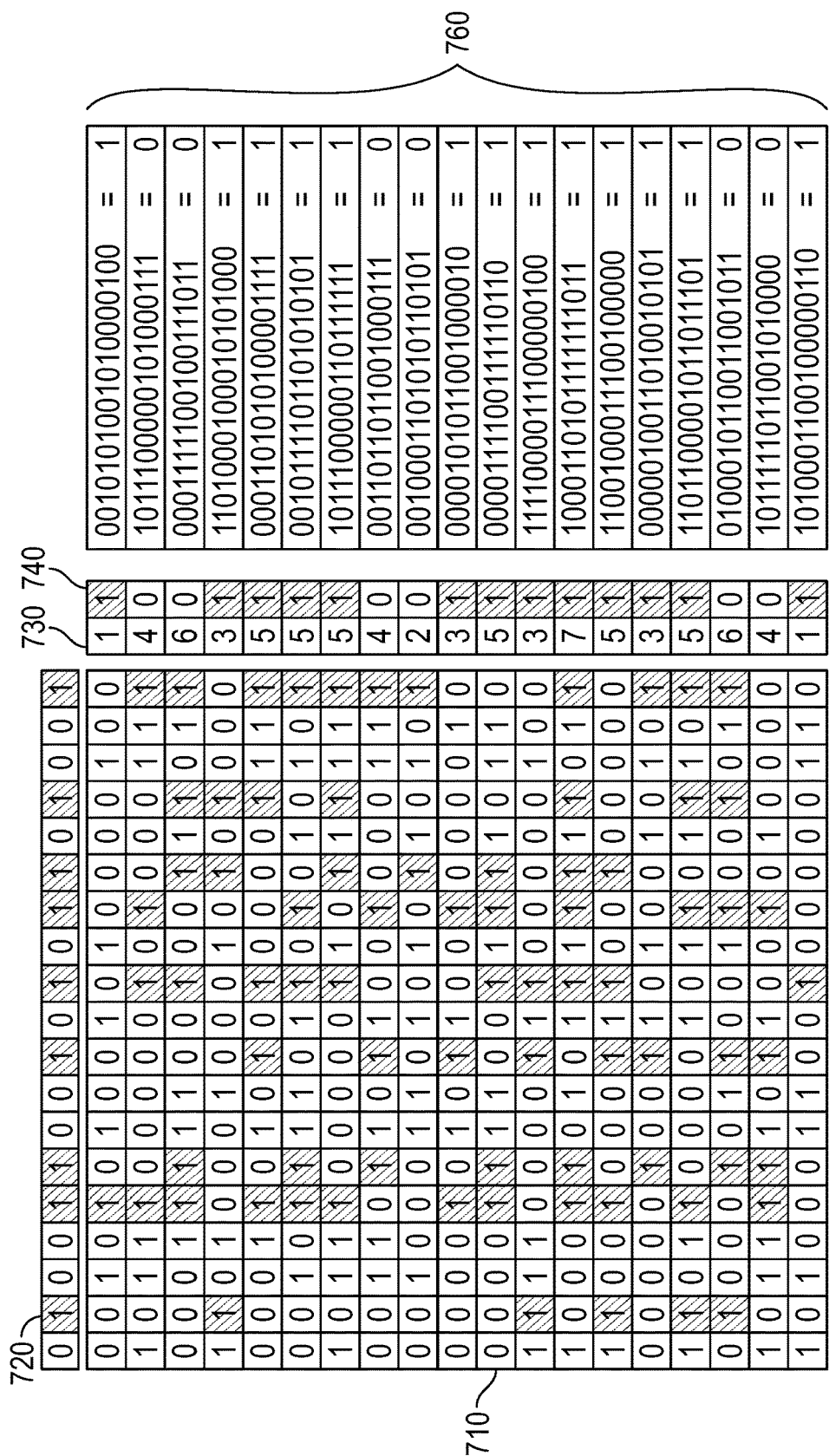
FIG. 7 is a data diagram showing summing matrix translation as applied to the first (sending) computing node in some embodiments.
Figure 8:
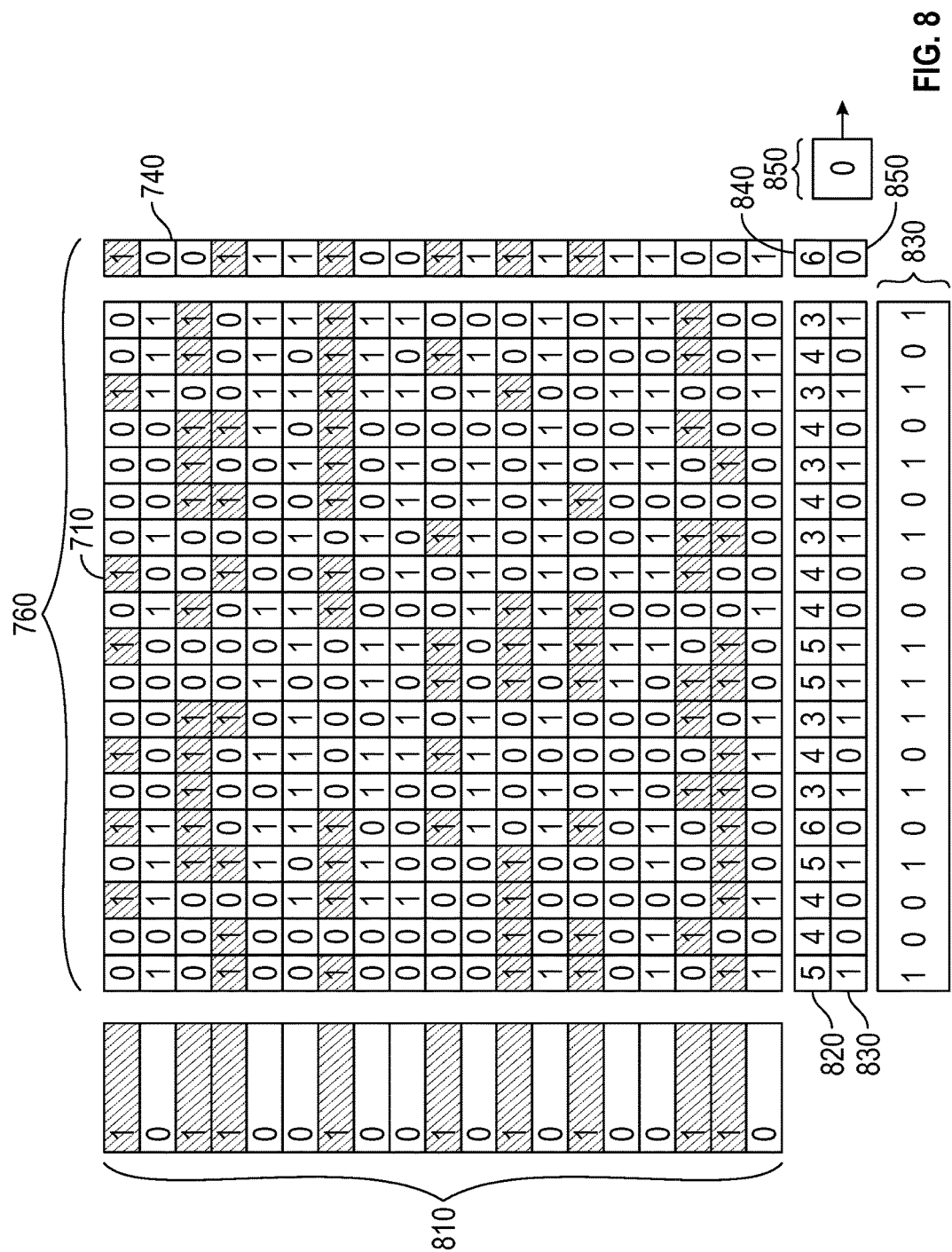
FIG. 8 is a data diagram showing symmetric code derivation as applied to the second (receiving) computing node in some embodiments.
Figure 9:
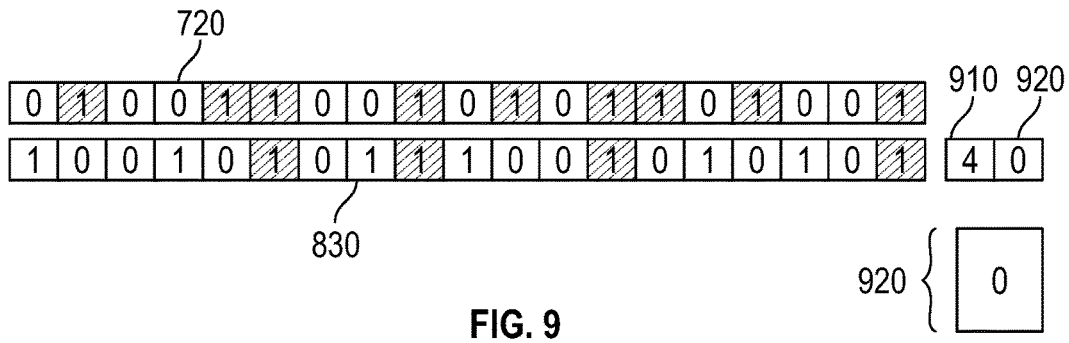
FIG. 9 is a data diagram showing symmetric code retrieval as applied to the first computing node in some embodiments.

FIGS. 7-9 demonstrate an example of an embodiment for the system in accordance of the method of cryptography disclosed herein. In particular, FIG. 7 is a data diagram showing summing matrix translation as applied to the first (sending) computing node in some embodiments. In particular, secret key 720 is a binary coded, 1×19 matrix. The interior matrix 710 is a binary coded, 19×19 matrix. In operation, the public module performs a logical AND operation on the secret key 720 and interior matrix 710, row by row to generate a resultant matrix signified by the shaded, highlighted blocks, wherein the shaded blocks represent a binary "1" and the non-shaded blocks represent a binary "0." Next, a sum modulo 2 operation may be performed on each row vector of the resultant matrix to form the summing matrix. In particular, given the first row of the interior matrix 710, there is only one shaded element in the row; therefore, the sum of the binary "1"s in the row equals one. The sum modulo 2 of 1 is 1. This sum is reflected as the first element of first column of the summing matrix 740. Similarly, the sum of the binary "1"s of the second row is 4, as shown in vector 730. The sum modulo 2 of 4 is 0. Accordingly, this sum of 0 is reflected as the second element of the first column of the summing matrix 740. A sum modulo 2 is performed on each row vector of the resultant matrix to derive the entire summing matrix 740. Ultimately, the public code 760 which may be sent to the client node may include the interior matrix 710 aggregated with the summing matrix 740.

Proceeding with the example, FIG. 8 shows a data diagram showing symmetric code derivation as applied to the second (receiving) computing node in some embodiments. The receiving computing node receives the public code 760 from the initiating node. Further, a select vector 810 may be generate using one of the random number generation methods disclosed above. In particular for the example shown, the select vector 810 is a binary coded, 19×1 matrix. The public code 760 received by the client node includes the interior matrix 710 is a binary coded, 19×19 matrix aggregated with summing matrix 740 (sent by the client node, which generated the public code 760 as indicated in FIG. 7). In operation, the code generator module may parse the interior matrix 710 from the public code 760 based upon the predetermined dimension defined in the rule of obfuscation. Next, the obfuscation module performs a logical AND operation on the select vector 810 and interior matrix 710, row by row to generate a translated matrix code signified by the shaded, highlighted blocks, wherein the shaded blocks represent a binary "1" and the non-shaded blocks represent a binary "0." Next, a sum modulo 2 operation may be performed on each row vector of the translated matrix code to form the obfuscated matrix pattern, wherein each sum represents an element in a row rector of the obfuscated matrix pattern. In particular, the first element of the select vector 810 is a logical "1" wherein a logical AND operation is performed on the first row of the interior matrix 710. As shown, there are six binary "1"s that are highlighted. These represent the first row of in the translated matrix code. The obfuscation module continues to perform a logical AND operation on each of the remaining rows of the interior matrix 710 and the select vector 810. Next, a sum modulo 2 logical operation is performed on each column of the interior matrix to generate the obfuscated matrix pattern 830. For example given the first column of interior matrix 710, the sum of the logical "1"s is 5 (as shown in vector 820), which results in a 1 after the sum modulo 2 is performed on this sum. This sum is reflected as the first element of the obfuscated matrix pattern 830. Similarly, the sum of the binary "1"s of the second row is 4, as shown in vector 820. The sum modulo 2 of 4 is 0. Accordingly, this sum of 0 is reflected as the second element of the obfuscated matrix pattern 830. A sum modulo 2 is performed on each column vector of the translated matrix code to derive the entire obfuscated matrix pattern 830.

Similar to that noted above, upon receipt of the public code, the receiving computing node may parse the summing matrix 740 from the public code 760 based upon the predetermined dimension defined in the rule of obfuscation.

Thereby, a logical AND operation may be performed upon the select vector 810 and the summing matrix 740 to form a translated summing matrix (shaded portions). A sum modulo 2 logical operation may be performed on each column vector of the translated summing matrix to form the symmetric code 840, wherein each sum of each column vector represents a corresponding element of the symmetric code. In this particular example, the logical AND operation results in six logical "1"s being highlighted to represent "1"s in the translated summing matrix. Accordingly as shown, the symmetric code sum 840 is "6." Upon this sum, a modulo 2 operation is performed, resulting in a "0" as shown in 850. This resultant value represents the first element of the symmetric code 850. For this given example given that the pre-agreement dimension is a 256×256 matrix, each public code sent will result in another element to be added to the symmetric code. This symmetric code will remain with the receiving client and not sent onto the client node initiating the transfer.

Referring to FIG. 9, a data diagram showing symmetric code retrieval as applied to the first computing node in some embodiments is illustrated following the same example given above. As shown, the symmetric code module performs an AND logical operation upon the secret key 720 and the obfuscated matrix pattern 830, resulting in a translated obfuscation matrix (highlighted using the shaded blocks). A sum modulo 2 operation can be performed upon each row vector of the translated obfuscation matrix to form the symmetric code, wherein the sum modulo 2 of each row vector represents a corresponding bit of the symmetric code. In this example, the sum modulo 2 of the translated obfuscation matrix is 0, wherein the sum 910 is a 4 and the modulo 2 of 4 is 0, as shown as element 920. This element represents the first element of the recovered symmetric code 920. Thereby, each computing node is enabled to communicate privately with each other using the symmetric code to encrypt and decrypt messaging for transmission.

Figure 10:
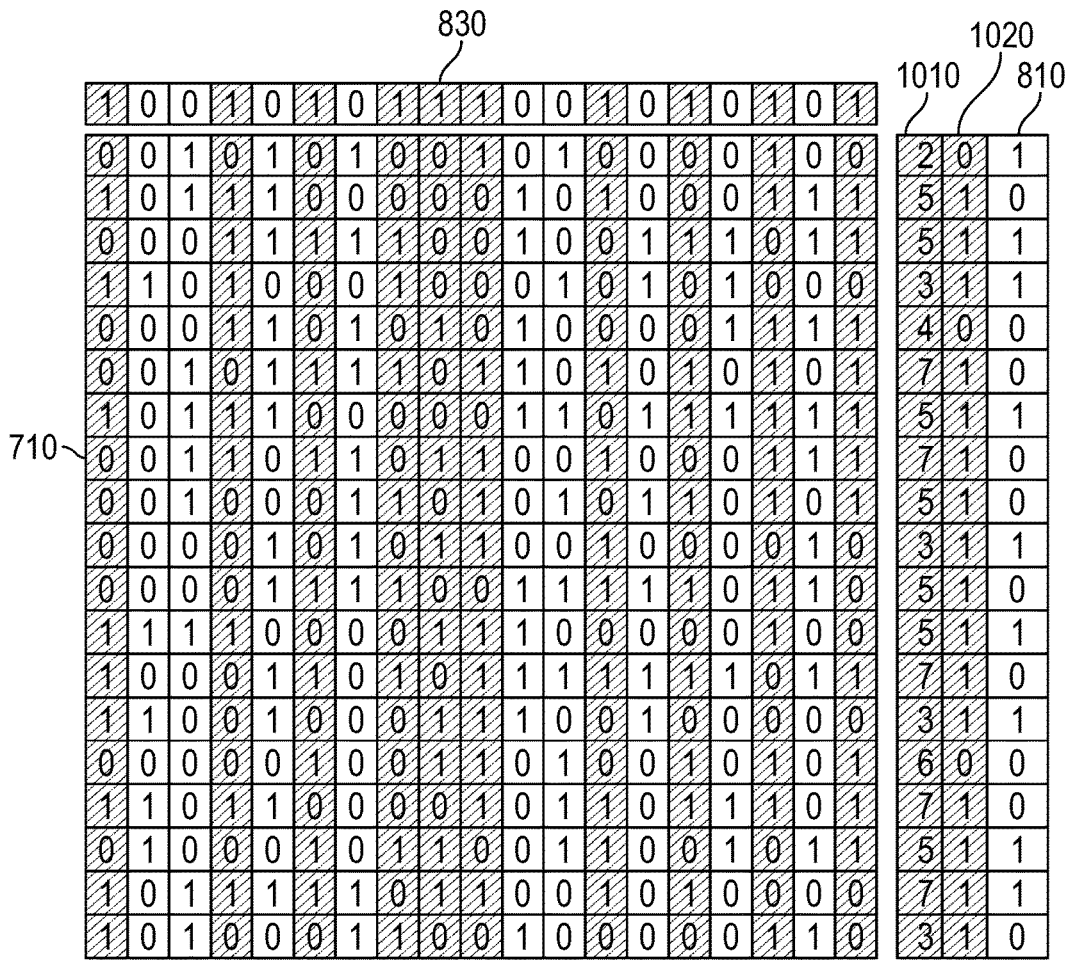
FIG. 10 is a data diagram displaying the data available to an unauthorized computing node and data translation of the same, in accordance with some embodiments.

FIG. 10 is a data diagram displaying the data available to an unauthorized computing node and data translation of the same, in accordance with some embodiments. For this same example from FIGS. 7-9, the unauthorized computing node is enabled to access the public code 760 and the obfuscated matrix pattern 830. Even if the unauthorized computing node were to perform the same logical operations upon these two matrices, it would be very difficult to generate the symmetric code used by the communicating client nodes. In particular the exclusive OR of the public code 760 (interior matrix 710) and the obfuscated matrix pattern 830, results in the highlighted matrix. Performing a sum modulo 2 of each row of this resultant matrix generates vector 1010 and 1020. Notably, the row vector of 1020 is not equivalent to the select vector 810 (which has been drawn to merely display that there is no correlation between the results of an unauthorized computing node and one having authorization). Additionally, it is notable that the row vector of 1020 is not equivalent to either the symmetric code (850, 920) generated at the sending and receiving nodes. Accordingly, there is no way for an unauthorized computing node to duplicate the full symmetric code 514 or parts thereof. Hence, since the recovered symmetric code 920 is kept as part of a secret information pool, any third person (such as, for example, client 220) will not be able to generate the symmetric code without the use of brute force testing. Analogous to guessing the secret key 219b of the initial client 210, this may take practically an infinite amount of time, since there $2^M$ ways to obfuscate M original row vectors into a new matrix.

It should be appreciated that the methods described herein may be performed with a digital processing system, such as a conventional, general-purpose computer system. Special purpose computers, which are designed or programmed to perform only one function may be used in the alternative. FIG. 11 is an illustration showing an exemplary computing device 1100, which may implement the embodiments described herein. The computing device of FIG. 11 may be used to perform embodiments of the functionality for performing the cryptography having key agreement in accordance with some embodiments. The computing device includes a central processing unit (CPU) 1102, which is coupled through a bus 1106 to a memory 1104, and mass storage device 1108. Mass storage device 1108 represents a persistent data storage device such as a floppy disc drive or a fixed disc drive, which may be local or remote in some embodiments. The mass storage device 1108 could implement a backup storage, in some embodiments. Memory 1104 may include read only memory, random access memory, etc. Applications resident on the computing device may be stored on or accessed through a computer readable medium such as memory 1104 or mass storage device 1108 in some embodiments. Applications may also be in the form of modulated electronic signals modulated accessed through a network modem or other network interface of the computing device. It should be appreciated that CPU 1102 may be embodied in a general-purpose processor, a special purpose processor, or a specially programmed logic device in some embodiments.

Display 1112 is in communication with CPU 1102, memory 1104, and mass storage device 1108, through bus 1106. Display 1112 is configured to display any visualization tools or reports associated with the system described herein. Input/output device 1110 is coupled to bus 1106 in order to communicate information in command selections to CPU 1102. It should be appreciated that data to and from external devices may be communicated through the input/output device 1110. CPU 1102 can be defined to execute the functionality described herein to enable the functionality described with reference to FIGS. 1-3. The code embodying this functionality may be stored within memory 1104 or mass storage device 1108 for execution by a processor such as CPU 1102 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for generating data for use in cryptography or secure modulation, the method comprising:
    generating a public code using a secret key by a processor, wherein the public code includes an interior matrix and a summing matrix, both having a predetermined dimension of rows and columns;
    sending the public code and a rule of obfuscation to a first computing device node using a transmitter, wherein the rule of obfuscation includes the predetermined dimension corresponding to the interior matrix and the summing matrix;

generating an obfuscated matrix pattern from the interior matrix using a processor, based upon at least a subset of parameters associated with the rule of obfuscation; and generating a symmetric code from the summing matrix using a processor, based upon the rule of obfuscation, for use in communication between the first computing device and a second computing device.

2. The method of claim 1, wherein the generating the public code comprising:

generating the secret key;

generating the interior matrix;

performing a logical AND operation on the secret key with the interior matrix to form a resultant matrix; and performing a sum modulo 2 on each row vector of the resultant matrix, wherein each sum represents a corresponding element of the summing matrix.

3. The method of claim 1, wherein the generating the obfuscated matrix pattern comprising:

generating a select vector based upon the rule of obfuscation;

parsing the interior matrix from the public code, based upon the predetermined dimension of the interior matrix as defined in the rule of obfuscation;

performing a logical AND operation on the select vector and the interior matrix to form a translated matrix code; and performing a sum modulo 2 on each column vector of the translated matrix code to form the obfuscated matrix pattern, wherein each sum represents an element in a row vector of the obfuscated matrix pattern.

4. The method of claim 1, wherein the generating the symmetric code comprising:

generating a select vector based upon the rule of obfuscation;

parsing the summing matrix from the public code, based upon the predetermined dimension of the summing matrix as defined in the rule of obfuscation;

performing a logical AND operation on the select vector and the summing matrix to form a translated summing matrix; and performing a sum modulo 2 on each column vector of the translated summing matrix to form the symmetric code, wherein the sum modulo 2 of each column vector represents a corresponding element of the symmetric code.

5. The method of claim 4, wherein the generating the select vector comprising:

generating a random number based upon a seed value determined by at least a subset of parameters associated with the rule of obfuscation; and translating the generated random number into a binary value, wherein each bit represents an element in the select vector having a predetermined length.

6. The method of claim 1, further comprising:

sending the obfuscated matrix pattern to the second computer node;

retrieving the symmetric key based upon the secret key; and initiating an encrypted communication session between the second computer node and the first computer node, using the symmetric key to encrypt and decrypt messages.

7. The method of claim 6, wherein the retrieving the symmetric code comprising:

performing a logical AND operation on the secret key and the obfuscation matrix pattern to form a translated obfuscation matrix; and performing a sum modulo 2 on each row vector of the translated obfuscation matrix to form the symmetric code, wherein the sum modulo 2 of each row vector represents a corresponding bit of the symmetric code.

8. The method of claim 1, further comprising:

initiating a communication session between the first computer node and the second computer node;

encrypting a message with a cryptography algorithm based upon the symmetric code;

sending the encrypted message; and decrypting the encrypted message with the symmetric code.

9. A computing device comprising:

a memory; and a processor coupled to the memory, the processor operable to:

generate a public code using a secret key, wherein the public code includes an interior matrix and a summing matrix, both having a predetermined dimension of rows and columns;

send the public code and a rule of obfuscation to a first computing device node, wherein the rule of obfuscation includes the predetermined dimension corresponding to the interior matrix and the summing matrix;

generate an obfuscated matrix pattern from the interior matrix, based upon the rule of obfuscation; and generate a symmetric code from the summing matrix, based upon the rule of obfuscation, for use in communication between the first computing device and a second computing device.

10. The computing system of claim 9, wherein the processor, for generating the public code, operable to:

generate the secret key;

generate the interior matrix;

perform a logical AND operation on the secret key with the interior matrix to form a resultant matrix; and perform a sum modulo 2 on each row vector of the resultant matrix, wherein each sum represents a corresponding element of the summing matrix.

11. The computing system of claim 9, wherein the processor, for generating the obfuscated matrix pattern, operable to:

generate a select vector based upon the rule of obfuscation;

parse the interior matrix from the public code, based upon the predetermined dimension of the interior matrix as defined in the rule of obfuscation;

perform a logical AND operation on the select vector and the interior matrix to form a translated matrix code; and perform a sum modulo 2 on each column vector of the translated matrix code to form the obfuscated matrix pattern, wherein each sum represents an element in a row vector of the obfuscated matrix pattern.

12. The computing system of claim 9, wherein the processor, for generating the symmetric code, operable to:

generate a select vector based upon the rule of obfuscation;

parse the summing matrix from the public code, based upon the predetermined dimension of the summing matrix as defined in the rule of obfuscation;

perform a logical AND operation on the select vector and the summing matrix to form a translated summing matrix; and perform a sum modulo 2 on each column vector of the translated summing matrix to form the symmetric code, wherein the sum modulo 2 of each column vector represents a corresponding element of the symmetric code.

13. The computing system of claim 9, wherein the processor further operable to:
send the obfuscated matrix pattern to the second computer node;
retrieve the symmetric key based upon the secret key; and
initiate an encrypted communication session between the second computer node and the first computer node, using the symmetric key to encrypt and decrypt messages.

14. The computing system of claim 13, wherein the processor, for retrieving the symmetric code, operable to:
perform a logical AND operation on the secret key and the obfuscation matrix pattern to form a translated obfuscation matrix; and
perform a sum modulo 2 on each row vector of the translated obfuscation matrix to form the symmetric code, wherein the sum modulo 2 of each row vector represents a corresponding bit of the symmetric code.

15. A non-transitory computer-readable medium including code for performing a cryptography method, the cryptography method comprising:
generating a public code using a secret key, wherein the public code includes an interior matrix and a summing matrix, both having predetermined dimension of rows and columns;
sending the public code and a rule of obfuscation to a first computing device node;
generating an obfuscated matrix pattern from the interior matrix, based upon the rule of obfuscation; and
generating a symmetric code from the summing matrix, based upon the rule of obfuscation, for use in communication between the first computing device and a second computing device.

16. The computer-readable medium of claim 15, wherein generating the public code comprising:
generating the secret key;
generating the interior matrix;
performing a logical AND operation on the secret key with the interior matrix to form a resultant matrix; and
performing a sum modulo 2 on each row vector of the resultant matrix, wherein each sum represents a corresponding element of the summing matrix.

17. The computer-readable medium of claim 15, wherein generating the obfuscated matrix pattern comprising:
generating a select vector based upon the rule of obfuscation;
parsing the interior matrix from the public code, based upon the predetermined dimension of the interior matrix as defined in the rule of obfuscation;
performing a logical AND operation on the select vector and the interior matrix to form a translated matrix code; and
performing a sum modulo 2 on each column vector of the translated matrix code to form the obfuscated matrix pattern, wherein each sum represents an element in a row vector of the obfuscated matrix pattern.

18. The computer-readable medium of claim 15, wherein generating the symmetric code comprising:
generating a select vector based upon the rule of obfuscation;
parsing the summing matrix from the public code, based upon the predetermined dimension of the summing matrix as defined in the rule of obfuscation;
performing a logical AND operation on the select vector and the summing matrix to form a translated summing matrix; and
performing a sum modulo 2 on each column vector of the translated summing matrix to form the symmetric code, wherein the sum modulo 2 of each column vector represents a corresponding element of the symmetric code.

19. The computer-readable medium of claim 18, wherein generating the select vector comprising:
generating a random number based upon a seed value determined by at least a subset of parameters associated with the rule of obfuscation; and
translating the generated random number into a binary value, wherein each bit represents an element in the select vector having a predetermined length.

20. The computer-readable medium of claim 15, further comprising:
sending the obfuscated matrix pattern to the second computer node;
retrieving the symmetric key based upon the secret key; and
initiating an encrypted communication session between the second computer node and the first computer node, using the symmetric key to encrypt and decrypt messages.

* * * * *